C. W. HODGES.
CHAIN.
APPLICATION FILED OCT. 27, 1919.
1,372,693.
Patented Mar. 29, 1921.
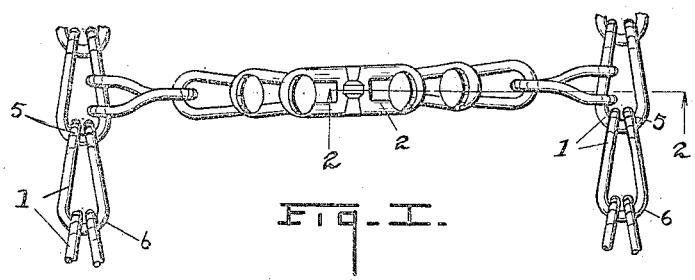
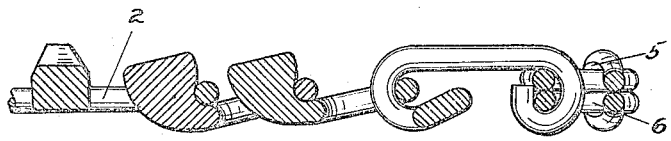
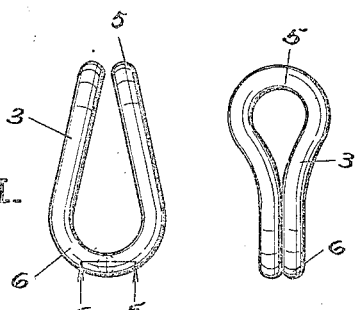
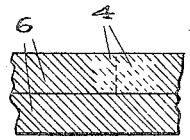
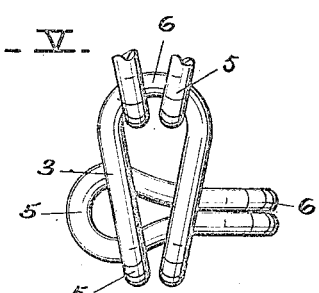
Inventor
Chauncey W. Hodges
Witnesses
Fred Ullrich
Lenn Gilman
By Chappell & Earl
Attorneys

UNITED STATES PATENT OFFICE.

CHAUNCEY W. HODGES, OF GALESBURG, MICHIGAN.

CHAIN.

1,372,693.　　　　　　Specification of Letters Patent.　　Patented Mar. 29, 1921.

Application filed October 27, 1919.  Serial No. 333,783.

*To all whom it may concern:*

Be it known that I, CHAUNCEY W. HODGES, a citizen of the United States, residing at Galesburg, county of Kalamazoo, State of Michigan, have invented certain new and useful Improvements in Chains, of which the following is a specification.

This invention relates to improvements in chains.

The main objects of this invention are to provide an improved chain in which the links are formed of wire or light rod which is very simple and economical in structure and at the same time strong and durable, and the links easily assembled or disassembled.

Further objects, and objects relating to structural details will definitely appear from the detailed description to follow.

I accomplish the objects of my invention by the devices and means described in the following specification. The invention is clearly defined and pointed out in the claim.

A structure which is a preferred embodiment of my invention is clearly illustrated in the accompanying drawing, forming a part of this specification in which:

Figure I is a detail view of an antiskid tire chain embodying the features of my invention.

Fig. II is a detail section on a line corresponding to line 2—2 of Fig. I.

Fig. III is a plan view of one of the links.

Fig. IV is a side view thereof.

Fig. V is an enlarged detail section on a line corresponding to line 5—5 of Fig. III.

Fig. VI is a detail view illustrating the method of assembling and disassembling the links.

In the drawing similar reference characters refer to similar parts throughout the several views, and the sectional views are taken looking in the direction of the little arrows at the ends of the section lines.

Referring to the drawing, 1 represents the side chains of a tire antiskid chain, and 2 one of the cross members thereof. I have illustrated my improvements in this relation as one of the main objects which I had in mind was to provide a chain specially adapted for use in this relation. The cross member 2 is substantially that shown in Letters Patent No. 1,293,436 issued to me February 4, 1919.

The chains 1 are formed of U-shaped links 55 each link being formed of a single piece of wire folded upon itself with its ends 4 abutting and welded together at the bight of the link. The welding is conventionally illustrated in Fig. V. The end folds of the wire 60 form loops 5 through which an arm of a coacting link may be introduced to engage the bight 6 of such link with the loops 5. The portions of the link between the loops or eyes 5 lie side by side as shown in Figs. IV 65 and V.

By thus forming the links they may be quickly assembled and disassembled as occasion may require and the links are very strong in proportion to the weight of the 70 materials used. A comparatively large wearing surface is provided for the links. The chains are particularly well adapted for use as side members for tire chains as there are no projecting parts likely to wear or 75 abrade the tires, and the chains, as stated, possess great strength and durability in proportion to the weight of the material used.

My improved chains are, however, desirable for use in numerous other relations.　80

Having thus described my invention, what I claim as new and desire to secure by Letters Patent is:

A chain comprising U-shaped links each formed of a single piece of wire folded into 85 a loop and the loop folded upon itself with the ends of the wire abutting, the end folds of the wire forming loops through which the arm of a coacting link may be introduced to engage the bight of said link with said loops, 90 the portions of the links between such end loops lying side by side and being welded together at the bight of the link, such welding including the abutting ends of the wire.

In witness whereof, I have hereunto set 95 my hand and seal in the presence of two witnesses.

CHAUNCEY W. HODGES. [L. S.]

Witnesses:
M. L. GLASGOW,
LORENA SUMMERS.